No. 781,133. PATENTED JAN. 31, 1905.
C. E. DEWEY.
PROCESS OF TREATING ZINC SULFID ORES CONTAINING IRON.
APPLICATION FILED APR. 2, 1904.
2 SHEETS—SHEET 1.
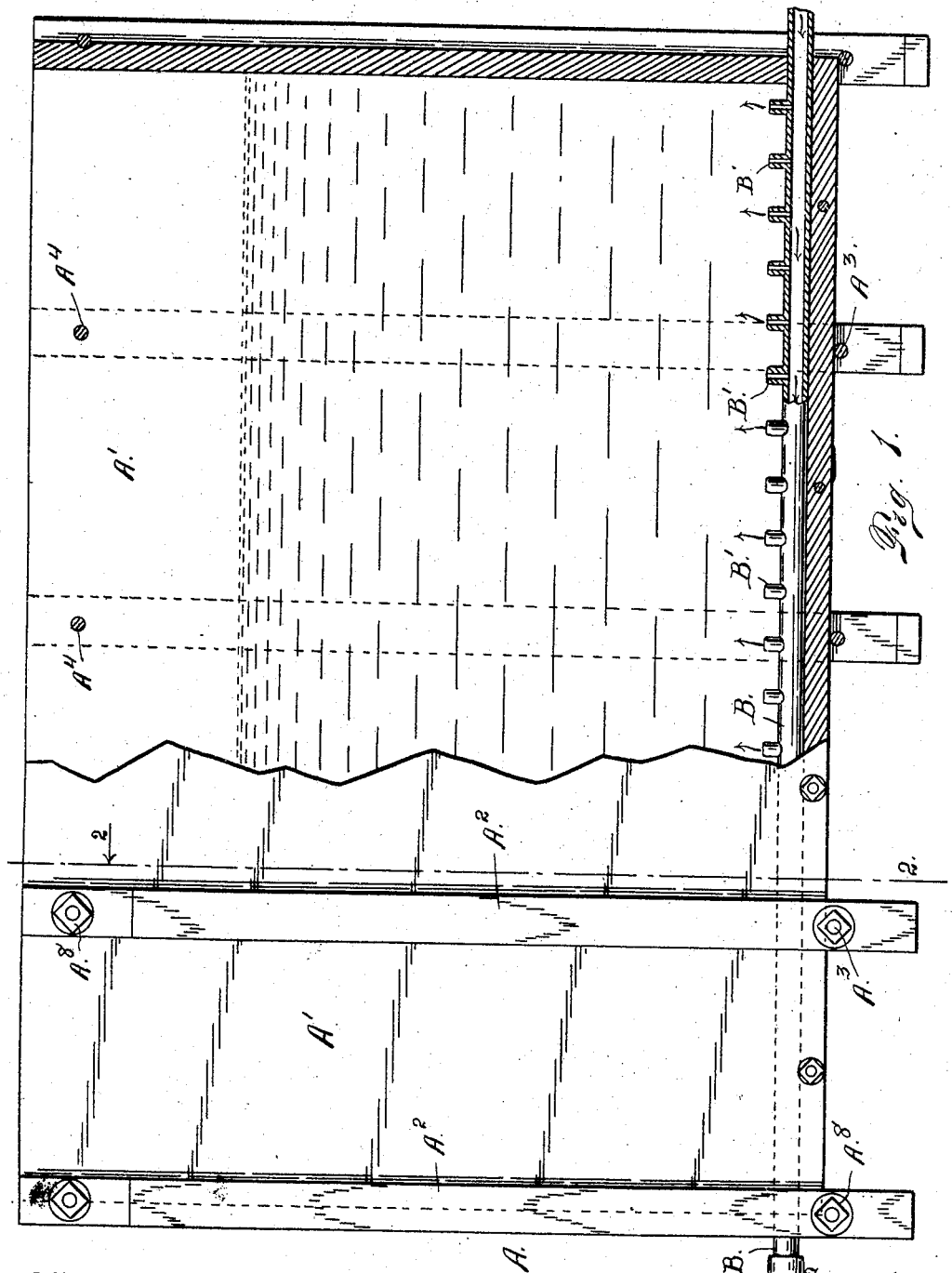

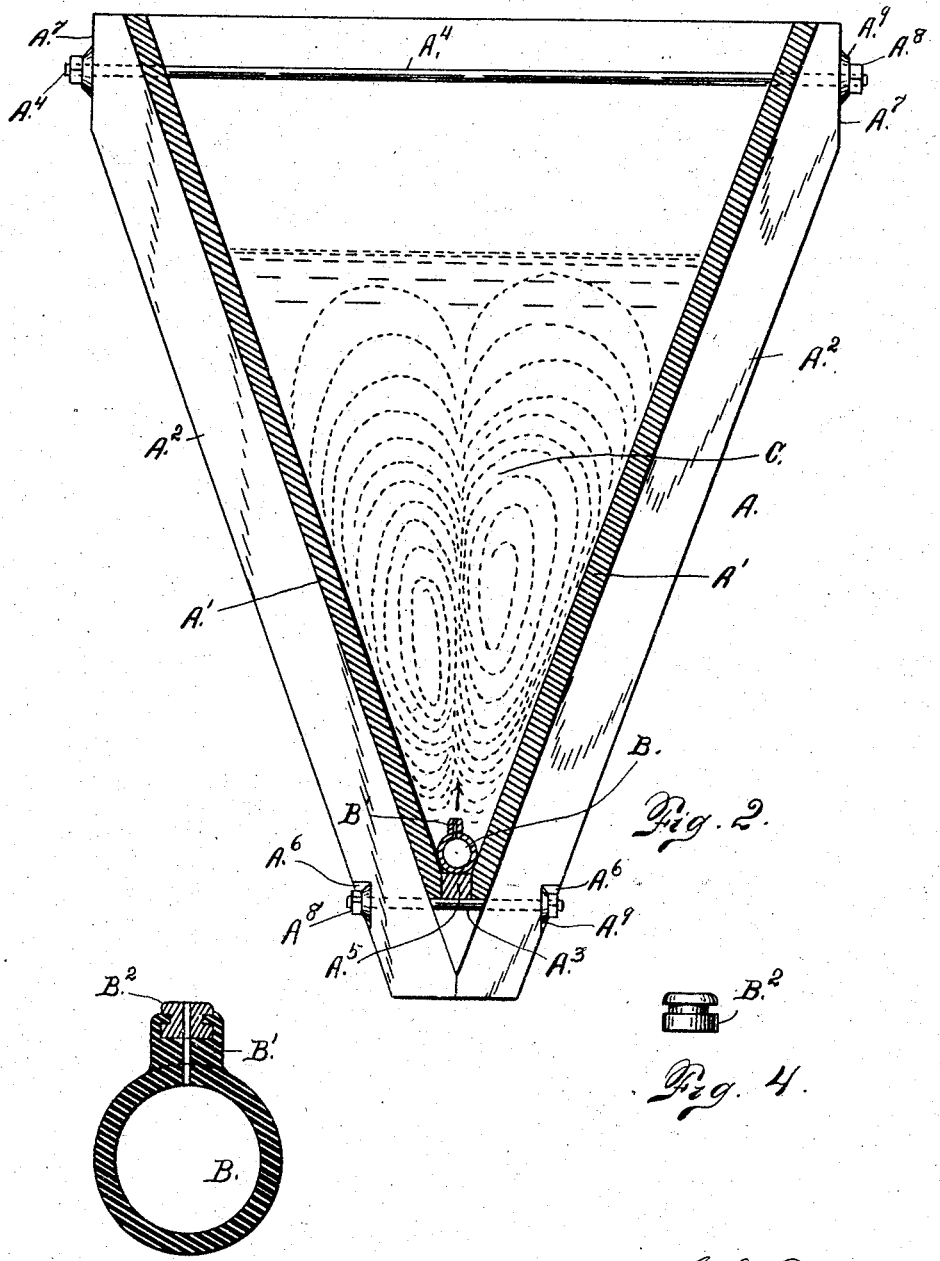

No. 781,133. Patented January 31, 1905.

UNITED STATES PATENT OFFICE.

CHAUNCEY E. DEWEY, OF DENVER, COLORADO, ASSIGNOR TO THE AMERICAN ZINC AND CHEMICAL COMPANY, OF DENVER, COLORADO.

PROCESS OF TREATING ZINC-SULFID ORES CONTAINING IRON.

SPECIFICATION forming part of Letters Patent No. 781,133, dated January 31, 1905.

Application filed April 2, 1904. Serial No. 201,354.

*To all whom it may concern:*

Be it known that I, CHAUNCEY E. DEWEY, a citizen of the United States of America, residing in the city and county of Denver and State of Colorado, have invented certain new and useful Improvements in Processes of Treating Zinc-Sulfid Ores Containing Iron; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a process of treating sulfid ores containing some iron and considerable quantities of zinc.

In the practice of my process the ore is first roasted in such a manner that the zinc is converted into zinc sulfate and zinc oxid and the iron present converted into ferric oxid as far as practicable. The period of roasting is immaterial so long as the results sought are obtained, and the time will undoubtedly vary with different ores. The time of roasting may, however, be considered twenty-four hours approximately, though it must be understood I do not limit the invention to any exact period, but simply specify the time in order to make the explanation as definite as possible and in order to give those skilled in the art a general idea with reference to the matter, whereby they may be enabled to practice the process without difficulty. After the ore is roasted with the result aforesaid it is charged into tanks of suitable shape containing a quantity of water, assuming that the operation has just commenced and that this is the first charge of ore. The ore is then maintained in suspension throughout the liquid by the introduction at the bottom of the tank, which is preferably V-shaped, of a mixture of air and sulfurous gas preferably taken from the furnace employed in roasting the ore, or a mixture of steam, air, and sulfurous gas may be introduced.

Through the instrumentality of the step set forth in the preceding paragraph the zinc oxid present is dissolved and converted into zinc sulfite, and through a reaction with the ferric oxid present in the ores the zinc sulfite is converted into zinc sulfate, in which last-named form the zinc is removed from the residue of the ore by filtering, decantation, or in any other suitable manner. After the filtering or decantation step, as the case may be, is complete the ore is washed in order to remove the balance of the zinc sulfate, and enough of the latter is removed with the wash-water to form the latter into a weak solution of zinc sulfate, and the subsequent charge of roasted ore is introduced into this weak sulfate solution instead of pure water, as in the case of the first charge. In this way I am able to use the wash-water of the last charge for the treatment of the ore of the next succeeding charge, since the wash-water is too weak in sulfate solution to justify its mixture with the strong solution removed from the ore by filtering or decantation, as aforesaid.

Suitable mechanism for carrying out or practicing the process heretofore explained will now be described in detail, reference being made to the accompanying drawings, though it must be understood that while I prefer to use the mechanism employed, since entirely satisfactory results are obtained thereby, I do not limit myself to the special mechanism set forth in this application. Attention is furthermore called to the fact that nothing is claimed on the apparatus described in this application, since a special application will be filed for the protection of the said apparatus. The application just referred to was filed April 2, 1904, Serial No. 201,353.

In the drawings, Figure 1 is a side view, partly in vertical longitudinal section, taken through a V-shaped tank. Fig. 2 is a section taken on the line 2 2, Fig. 1, being a cross-section of the treatment or leaching tank. Fig. 3 is a cross-section, shown on an enlarged scale, of a special construction of lead pipe located in the bottom of the V-shaped tank, and into which the sulfurous acid, whether with air or air and steam, is introduced during the leaching operation. Fig. 4 is a detail view in side elevation of a porcelain nipple which may be applied to each vertically-disposed nozzle of the lead-pipe conduit.

The same reference characters indicate the same parts in all the views.

Let A designate a leaching-tank in its entirety, the said tank being V-shaped in cross-section, as shown in Fig. 2. The inclined side walls A' of this tank are supported by exteriorly-located beams or bars $A^2$, which are connected by tie-rods $A^3$ and $A^4$, located at the top and bottom of the tank, respectively, and to the extremities of which nuts are applied, whereby the sides of the tank are suitably supported to give the structure the desired strength and durability. In the bottom of this tank and resting on a strip $A^5$, which forms a support therefor, is located a horizontally-disposed conduit B, which extends the entire length of the leaching-tank and is provided at short intervals with vertically-disposed nozzles B', provided with orifices adapted to direct the gas introduced into the tank upwardly into the ore charge C in the tank, whereby the contents of the tank are thoroughly agitated and the ore particles held in suspension in the manner indicated in Fig. 2 of the drawings. The conduit B is preferably composed of lead, since it resists the action of the chemicals.

After the ore is roasted it is charged into the tank A, which contains a suitable quantity of water for the purpose, and the sulfurous gas or sulfurous gas and air or air and steam, as desired, are introduced into the pipe B, whereby jets of the fluid are directed upwardly under suitable pressure into the ore of the tank, whereby the ore particles are held in suspension, as heretofore explained and as indicated in the drawings. After the leaching operation has been continued a suitable length of time—say from twelve to twenty-four hours, depending upon the character of the ore under treatment—the introduction of the gas is discontinued and the dissolved zinc in the form of zinc sulfate removed from the ore by filtering, decantation, or otherwise, as may be desired. After the removal of the zinc sulfate is as complete as can be readily accomplished by the method employed the ore is subjected to a charge of wash-water for the purpose of removing the remaining zinc sulfate solution. This wash-water is then drawn off into a leaching-tank and the next charge of ore delivered into this weak sulfate solution, thus making the wash-water for the previous charge the solution for the succeeding charge, and so on.

It is preferred that the amount of iron in the ore to be treated by my improved process should not be less than approximately ten per cent. in order to produce the necessary ferric oxid for the purpose described.

Having thus described my invention, what I claim is—

1. A process of treating sulfid ore containing iron and zinc, consisting in roasting the ore, placing it in water, and maintaining the ore in suspension in the solution by the introduction of sulfurous gas and air.

2. A process of treating zinc-sulfid ore containing iron consisting in roasting the ore, adding a quantity of water thereto, and maintaining the ore in suspension a suitable period by the introduction of sulfurous gas, air and steam.

3. The herein-described process for the treatment of zinc-sulfid ores containing iron, consisting first in roasting the ore, whereby the zinc is converted into zinc sulfate and zinc oxid, and the iron present, into ferric oxid as far as practicable; second, placing the ore thus prepared in water; and third maintaining the ore in suspension in the solution by the introduction of sulfurous gas whereby the zinc oxid present is formed into zinc sulfite, and the latter into zinc sulfate by reaction with the ferric oxid.

In testimony whereof I affix my signature in presence of two witnesses.

CHAUNCEY E. DEWEY.

Witnesses:
DENA NELSON,
A. J. O'BRIEN.